United States Patent [19]

Lam

[11] Patent Number: 4,492,853
[45] Date of Patent: Jan. 8, 1985

[54] ELECTRICALLY HEATED COOKING OR FOOD HEATING DEVICES

[75] Inventor: Yanta Lam, Kowloon, Hong Kong

[73] Assignee: Meyer Manufacturing Company, Limited, Kwun Tong, Hong Kong

[21] Appl. No.: 502,314

[22] Filed: Jun. 8, 1983

[51] Int. Cl.³ .............................................. F27D 11/02
[52] U.S. Cl. ..................................... 219/432; 99/403;
  219/430; 219/438; 219/521; 219/463
[58] Field of Search ............... 219/429, 430, 432, 433,
  219/438, 439, 441, 442, 458, 462, 463, 521;
  99/403

[56] References Cited

U.S. PATENT DOCUMENTS

| | | | |
|---|---|---|---|
| 2,863,037 | 12/1958 | Johnstone | 219/432 |
| 3,010,006 | 11/1961 | Schwaneke | 219/438 |
| 3,187,163 | 6/1965 | Wells et al. | 219/441 |
| 3,681,568 | 8/1972 | Schaefar | 219/432 |
| 3,831,002 | 8/1974 | Mysicka et al. | 219/432 |
| 4,268,741 | 5/1981 | O'Brien | 219/430 X |
| 4,270,067 | 5/1981 | Thomas et al. | 219/438 |

FOREIGN PATENT DOCUMENTS

| | | | |
|---|---|---|---|
| 2514604 | 10/1976 | Fed. Rep. of Germany | 219/438 |
| 245324 | 7/1947 | Switzerland | 219/430 |
| 128410 | 6/1919 | United Kingdom | 219/432 |

Primary Examiner—Volodymyr Y. Mayewsky
Attorney, Agent, or Firm—Wood, Herron & Evans

[57] ABSTRACT

Electrically heated cooking pans usually have a number of supporting legs, each of which is fixed individually to the underside of the pan. The assembly of such items is expensive and time-consuming and in addition failure of one leg can result in the whole device becoming useless and if failure occurs during cooking can be dangerous. According to the invention, a circular stand is used which replaces individual legs and only a single central fixing point is required for the ciruclar stand. Normally, the device will have its own electrical heater permanently secured to the base of the pan and this will have a metal cover to enclose the heater. The circular stand will normally be of synthetic plastics material and secured to the cover. The cover in turn can then be secured by a single central screw to the under side of the pan.

5 Claims, 3 Drawing Figures

4,492,853

ELECTRICALLY HEATED COOKING OR FOOD HEATING DEVICES

This invention relates to electrically heated cooking or food heating devices and in particular devices of the type which are free-standing and have their own integral electrical heating element.

BACKGROUND OF THE INVENTION

Such devices are commonly used for cooking on a serving table in front of people who are about to eat or are used as free-standing items in, say, a kitchen where they are separate from the actual cooking hob. Such devices need to be supported in a steady and sturdy manner so that the hot cooking pan is clear of the surface on which the device is resting. This avoids scorching of that surface.

Normally such devices have a number of legs which are joined to the underside of the heated cooking container. At least three legs are necessary for stability and normally four legs are used to give improved stability.

There are however many disadvantages in using individual legs. First of all, each leg has to be separately joined to the metal food container and the join has, for reasons of hygiene, to be of a type which will leave the interior of the cooking pan completely flat. This can be achieved by localised resistance welding of a small spigot or the like to the cooking pan but such welds are relatively time-consuming and expensive if a good secure join is to be achieved and thereafter each individual leg or foot has to be individually joined to the spigot. Also, the use of even four legs can often still result in a relatively unstable structure. By way of example, if the cooking pan is in the form of a wide, shallow pan, it is not really practical to join the legs at points far removed from the centre and so the pan can still easily be tipped over during use.

Further, if a leg or the join between a leg and the pan falls, the device is immediately rendered useless and this can be dangerous if there is hot cooking oil or the like in the pan which can spill or splash onto the user.

It is therefore an object of the present invention to provide a cooking device which is more stable in use and which is cheaper and simpler to manufacture.

BRIEF SUMMARY OF THE INVENTION

According to the invention, there is provided an electrically heated cooking or food heating device comprising a metal food container having a base and upstanding sides, an electrical heating element attached to the underside of the base for heating food in the container, a stud fixed to the approximate centre of the underside of the base and extending downwardly therefrom, a pan-shaped metal cover defining with the underside of said base, an enclosed region for the electrical heating element, a central hole through that cover, a locking device extending through said central hole and fixed to said stud to hold said cover in place, and a synthetic plastics material stand attached to the underside of said cover, said stand comprising a circular ring having an outer periphery and an inner periphery, a downwardly depending flange approximately at the outer periphery, said downwardly depending flange having a lower edge for supporting said device on a flat surface, a portion adjacent said inner periphery on which the underside of said cover rests, means for joining said cover to said stand and an intermediate upstanding circular flange defining a central open-topped bowl-shaped region in which the lower end and base of said pan-shaped cover is positioned.

Amongst the advantages of the invention is the fact that the resulting device is steady and sturdy in use and to give this sturdiness can be attractively shaped so that the appearance of the item to a customer is attractive. By way of example, the base preferably has a downwardly inclined portion extending between the intermediate upwardly extending flange and the downwardly depending flange at the outer periphery of the ring.

It is also quite simple and cheap to produce the plastics material stand and the stand has the advantage that it can be used interchangeably with a number of different cooking devices produced by the manufacturer. It may be that metal covers of different depths may be required for different models but the standardisation of the stand can reduce inventory problems for the manufacturer.

A further important advantage is the provision of only a single fixing point to the cooking bowl instead of having to provide as many fixing points as there are legs. This single fixing point also has the advantage that the stand and cover can very quickly and easily be joined to the rest of the device, e.g. by tightening up a single screw and this can greatly speed up and cheapen the assembly of the device. In addition, for the ultimate user, there is the advantage that for cleaning purposes, he can quickly and easily remove that screw together with the stand and cover and thereafter immerse the whole of the cooking bowl in water for cleaning purposes.

In the event of failure of the single central stud, the whole device is not immediately rendered inoperative but the user can complete the cooking operation and without too much risk of the food spilling since the stand and cover will still give reasonable support to the food container around the upper rim of the cover.

The metal cover will contain most of the heat produced by the electrically heat element and, especially if given an inner heat-reflective surface, will direct most of this to the underside of the food container to heat and cook the food. The cover is however likely to get quite hot. Therefore, to reduce the area of contact between it and the synthetic plastics stand so as to reduce heat transfer to the latter, it is desirable for the stand to have a number of radially spaced lugs upstanding from said inner portion adjacent said inner peripheral edge, the underside of said cover resting on the tops of said lugs to reduce the area of contact between said cover and said stand.

DESCRIPTION OF THE DRAWINGS

The invention will now be described, by way of example, with reference to the accompanying drawing, in which.

DESCRIPTION OF THE PREFERRED EMBODIMENT

Figure 1:
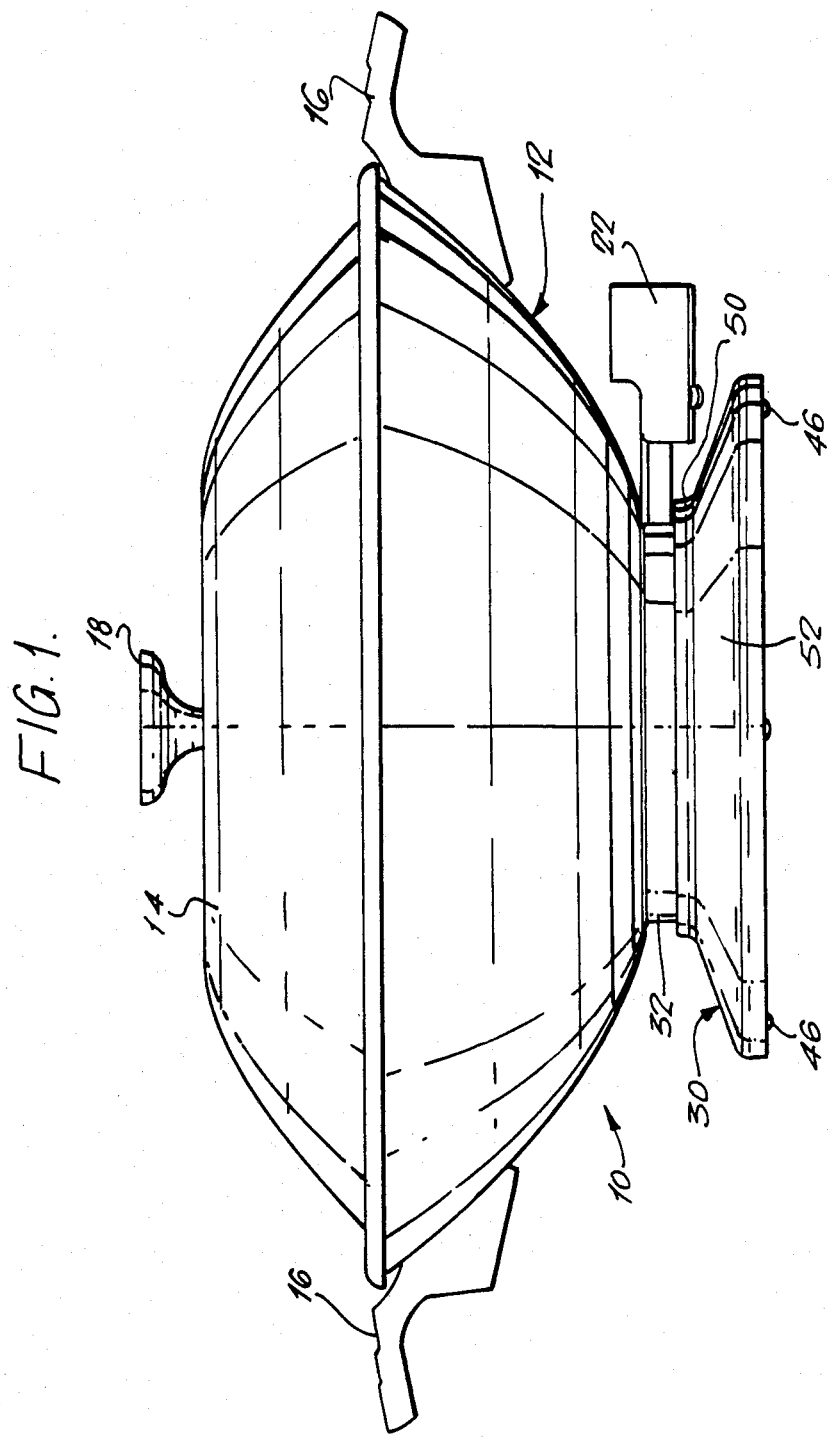
FIG. 1 is a side elevation of one form of cooking device according to the invention.
Figure 2:
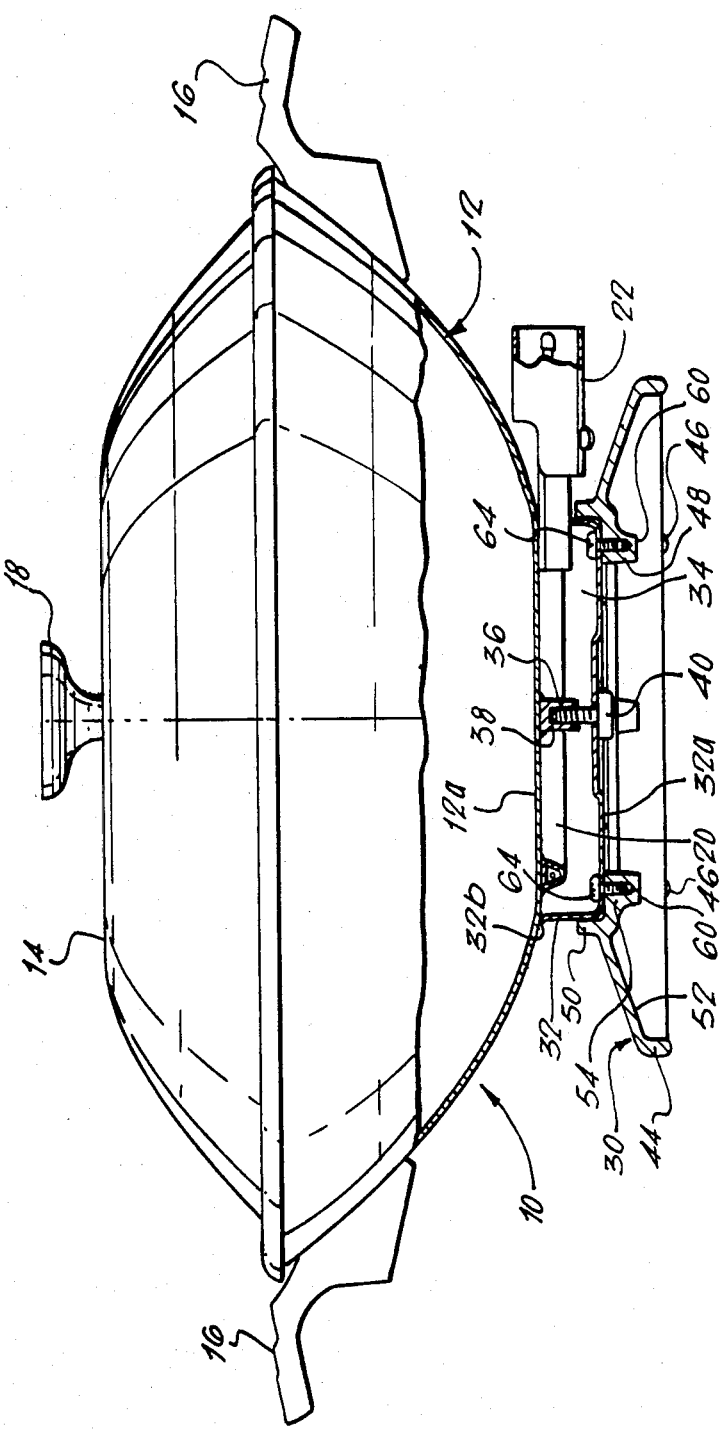
FIG. 2 is a part-elevation, part-section with the lower part of the device shown in diametric upright cross-section.

The cooking device 10 shown in the drawings is in the form of a Chinese wok having a relatively wide, open-topped metal bowl or pan 12, e.g. of aluminium, covered with a lid 14. The bowl 12 has a flat central base 12a and to opposite sides are attached handles 16 for convenience in carrying the device. The lid 14 also has a central handle 18 to enable it to be removed quickly and easily.

To the underside of the central base 12a is permanently affixed an electrical heating element 20. This is of known type and is not believed to require any fuller explanation. The heating element terminates at a socket 22 to which an electrical supply lead can be attached for use. The heating element is of the type which is completely sealed so that it can safely be immersed in water to enable the bowl 12 to be thoroughly cleaned after use.

The device is provided with a circular base or stand 30. Positioned between the stand 30 and the underside of the bowl 12 is a bowl-shaped metal cover 32. The latter defines with the central base 12a an enclosed region 34 in which the heating element is positioned. One side of the cover 32 has a small cut-out portion to enable the ends of the heating element to pass therethrough to the socket 22. The cover 32 largely contains the heat produced by the element 20 and ensures that most of it passes to the bowl 12 to heat and cook food therein. To assist in this, the inside surface of the cover is preferably relatively shiny and heat-reflecting.

Attached to and hanging down from the underside of the central base 12a is a metal stud 36 having a tapped hole 38. The cover 32 has a central hole in its base 32a and a threaded bolt 40 passes through this hole and is screwed into the tapped hole 38 to secure the cover in place against the underside of the pan or bowl 12, the head of the bolt 40 being too large to pass through the hole in the base 32a. Because the upper edge 32b of the cover supports the bowl 12 substantially completely around the circumference of the cover, forces on the stud 36 are longitudinal rather than transverse shearing forces. This greatly reduces stress on the stud 36 and in comparison with an equivalent stud joined to an individual foot positioned near the ring of contact between the cover 32 and the pan 12 there are virtually no shearing forces which have been found to be responsible for many failures of conventional supporting feet.

The stand 30 has near its outer periphery a downwardly directed flange 44 and the lower face of this supports the device. If desired, a number of small integral dimples 46 can be provided for actual contact between the stand 30 and the supporting surface.

The base 30 has a central open edge 48 and, intermediate that edge 48 and the flange 44, is an upstanding rim 50. This rim defines an upper bowl-shaped region in which the cover 32 is positioned and rests.

Between the upstanding flange 50 and the downwardly depending flange 44 is a downwardly inclined circular web 52. This, as best shown in FIG. 1, gives the stand a smooth and attractive appearance.

Inwardly of the upstanding flange 50 is a flat inner ring portion 54 on which the cover 32 rests. A number of radially spaced upwardly directed lugs 56 and 58 are provided in this region and actual contact between the hot cover and base 30 is provided by the top surfaces of these lugs 56 and 58.

The lugs 56 are narrower than the lugs 58 and they alternate with one another in a radial sense. The wider lugs 58 also correspond to locally thickened regions 60 and are provided with small holes 62 into which screw 64 can be secured to join the cover and base 30.

Figure 3:
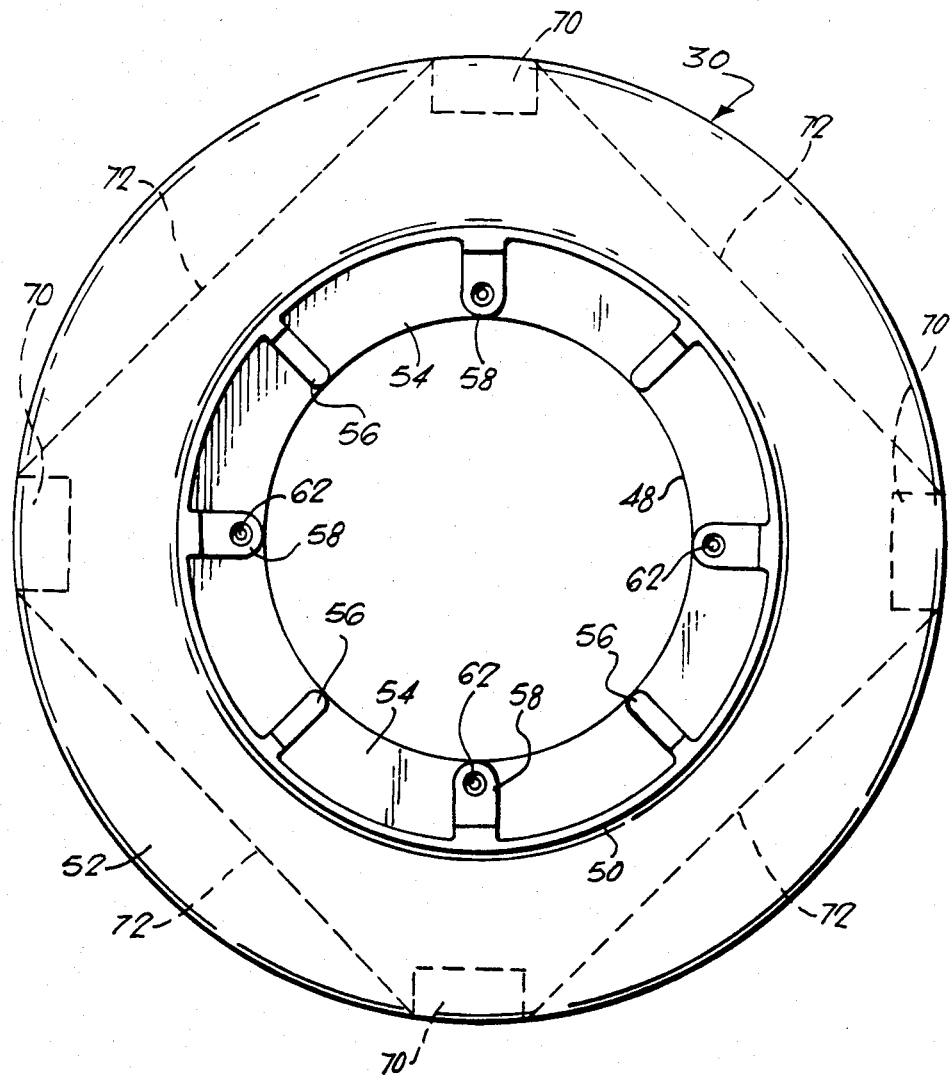
FIG. 3 is a plan view of the base of that cooking device.

It will be appreciated that the device described above has the advantages expressed earlier and in comparison with a cooking device having four legs is more secure. Thus, if for example a device were to have four legs 70 positioned so that they contact the supporting surface as shown in dotted lines in FIG. 3, then pressure during cooking on the inside of the bowl 12 will not cause the item with legs to become unstable provided the pressure is applied within the square region defined by the dotted line 72. It will be noted, however, that this region of stability is smaller than the corresponding region provided by using a base according to the invention which is defined by the outer periphery of the rim 30.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

I claim:

1. An electrically heated cooking or food heating device comprising
   a metal food container having a base and upstanding sides,
   a sheathed electrical heating element attached to the underside of the base for heating food in the container, said heating element having terminal connections,
   a stud fixed to the approximate centre of the underside of the base and extending downwardly therefrom,
   a pan-shaped metal cover defining with the underside of said base an enclosed region for the electrical heating element,
   a central hole through that cover,
   a locking device extending through said central hole and fixed to said stud to hold said cover in place, and
   a stand of synthetic plastics material attached to the underside of said cover, said stand comprising:
      a circular ring having an outer periphery and an inner periphery,
      a downwardly depending flange approximately at the outer periphery, said downwardly depending flange having a lower edge for supporting said device on a flat surface, a portion adjacent said inner periphery on which the underside of said cover rests,
      means for joining said cover to said stand, and
      an intermediate upstanding circular flange defining a central open-topped bowl-shaped region in which the lower end and base of said pan-shaped cover is positioned.

2. A device according to claim 1 in which said locking device comprises a screw-threaded bolt having a threaded shank and a head, said thread shank being screwed into said stud and said head holding said cover against the underside of said base.

3. A device according to claim 1 in which said stand further comprises a downwardly inclined web portion extending between said intermediate flange and said downwardly depending flange.

4. A device according to claim 1 in which said stand comprises
   a number of radially spaced lugs upstanding from an inner portion adjacent an inner peripheral edge, the underside of said cover resting on the tops of said lugs to reduce the area of contact between said cover and said stand.

5. A device according to claim 4 in which said stand comprises locally thickened portions in line with at least some of said lugs, said portions being defined to receive screws for joining said cover and said stand.

* * * * *